3,234,119
METHOD FOR TESTING THE EFFECTS OF METAL CONTAMINANTS ON SILICA-BASED CRACKING CATALYSTS
Henry Erickson, Park Forest, Ill., and Carl D. Keith, Summit, N.J., assignors, by mesne assignments, to Sinclair Research Inc., New York, N.Y., a corporation of Delaware
No Drawing. Filed Sept. 28, 1959, Ser. No. 842,604
7 Claims. (Cl. 208—119)

This application is a continuation-in-part of co-pending application Serial No. 705,511, filed December 27, 1959, now abandoned.

This invention concerns the controlled contamination of catalysts. It pertains more particularly to catalysts suitable for study in determining the catalyst-contaminating effects of minute amounts of metals contained in mineral oil cracking stocks.

The cracking of heavy hydrocarbon feedstocks to produce hydrocarbons of preferred octane ratings boiling in the gasoline range is widely practiced and uses a variety of solid catalysts to give end products of fairly uniform composition. Research on catalysts is concentrated on the production of new catalysts and improved methods for making and using known catalysts. New catalysts are desired which have improved physical properties, high equilibrium activity, improved selectivity in providing the valuable products which are made by their use, and improved regeneration properties. Refiners are concerned with the catalyst's physical stability toward attrition and its resistance toward steam and heat deactivation; but a primary concern is with change in product distribution as catalysts become contaminated with metals contained in the hydrocarbon feedstocks.

The cracking catalysts which have received the widest acceptance today are usually predominantly silica that is silica-based, and may contain solid acidic oxide promoters, e.g. alumina, magnesia, etc., with the promoters usually being less than about 35% of the catalyst, preferably about 5 to 25%. These compositions are in a state of very slight hydration. These materials may also contain small amounts of other materials such as non-volatile oxides, but current practice in catalytic cracking leans more toward the exclusion of foreign materials from the silica-alumina or silica-magnesia hydrate materials.

Aluminum silicates are silica-based materials used as cracking catalysts and may be produced either from natural clays by activation or by purely synthetic methods. The activation of natural clays, mostly of the montmorillonite type, is carried out by treatment with dilute acids, which remove excess alumina and oxides of calcium, iron, etc. and thus enrich the content of silica. Not only clays but also other aluminum silicates, such as zeolites, feldspar, etc., are activated for use as cracking catalysts.

The production of synthetic catalysts can be performed, for instance (1) by impregnating silica with aluminum salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by combination of hydrated silica with other hydrate bases as, for instance, magnesia, zirconia, etc. The activated or calcined, natural or synthetic catalysts must be relatively free of "impurities," mainly alkaline salts and ferric oxide. The presence of these constituents causes sintering of the catalyst surface on regeneration and a drop in catalytic activity. For this reason, the use of synthetic catalysts, which are more uniform and less susceptible to high temperatures in treatment and regeneration, is often preferable. As far as the yield of gasoline is concerned, the difference between the synthetic and natural activated catalyst is not very conspicuous.

One of the most important phases of study in the improvement of catalyst performance is in the area of metals poisoning. Various petroleum stocks have been known to contain at least traces of the following metals: iron, calcium, magnesium, aluminum, vanadium, nickel, copper, manganese, strontium, barium, cobalt, zinc, molybdenum, lead, tin, sodium, potassium, lithium, beryllium, bismuth, germanium, silver, gallium and gold. Most of these metals, when present in a cracking stock, deposit as a non-volatile compound on the catalyst during the cracking process, so that regeneration of the catalyst to remove coke does not remove these contaminants. Although referred to as "metals," the contaminants may be in the form of free metals or non-volatile metal compounds. It is to be understood that the term "metal" used herein refers to either form.

Metal contamination in catalytic cracking has had considerable attention. Two articles appearing in vol. 49, Industrial and Engineering Chemistry, No. 2, February 1957, illustrate the type of work which is being conducted in laboratories to secure data in the field of metals contamination of cracking catalysts. One aim of such studies is to derive a method for circumventing cracking catalysts contamination without resort to the removal of the metal contaminants.

Of the various metals which are to be found in representative catalyst cracking feedstocks some, like the alkali metals, only deactivate the catalyst without changing the product distribution; therefore they might be considered true poisons. Others such as iron, nickel, vanadium and copper markedly alter the character and pattern of the cracking reactions. For instance, it has been shown that the yield of gasoline, based on feed disappearance, dropped from 93 to 82% when the laboratory-measured coke factor of a catalyst rose from 1.0 to 3.0 in commercial cracking of a feedstock containing some highly contaminated marginal stocks. This decreased gasoline yield was matched by an increase in gas as well as coke. If a poison is broadly defined as anything that deactivates or alters the reactions promoted by a catalyst then all of these four metals can be considered poisons. It is hypothesized that these metals when deposited on the surface of the cracking catalysts superimpose their dehydrogenation activity on the cracking reactions and convert into carbonaceous residue and gas some of the material that would ordinarily go into gasoline. The relatively high content of hydrogen in the gases formed by metals-contaminated catalysts is evidence that dehydrogenation is being favored.

Laboratory work in the development of new catalyst compositions, for instance, by the addition of new components to commercial catalysts, requires comparative testing of the compositions before and after poisoning. Also, the selection of the engineering techniques to be used with a new cracking feedstock is determined by the type of side reactions likely to occur when the catalyst is poisoned with the metals contained in such feedstocks. Subjecting new catalysts and new feedstocks to pilot plant operations has been the only method known heretofore for obtaining catalysts poisoned in a manner which resembles the manner in which they are poisoned in actual commercial plant operation. The expense of such studies would be considerably reduced if a low-cost method were available for artificial poisoning.

Besides the expense involved in poisoning experimental catalysts by putting them through a pilot plant, it also is impossible to obtain a catalyst poisoned with only one metal to the exclusion of all others, since the hydrocarbon feedstocks invariably contain several metals. Catalysts secured as discard from commercial cracking operations are also disadvantageous for testing because of the rather light poisoning levels which such catalysts reach before the refiner must discard them in order to maintain satisfactory activity and product ratios.

In the past, efforts to artificially poison cracking catalyst by impregnation with water-soluble salts of the poisoning metals have resulted in catalyst activities and product distributions degraded much more severely than from catalysts containing the same quantity of deposited metal secured by the cracking of metal-bearing feedstocks. For this reason, data obtained from such impregnated catalysts are only of indicative rather than quantitative value.

Thus, the basic problem is that while the need for the study of the effects of metals poisoning and means of combatting them are constantly becoming more urgent, no simple method has been available for adding the metals in a manner equivalent in poisoning effect to natural deposition of the metals.

The scope of prior art methods for producing artificially poisoned cracking catalysts is shown in the articles cited above. It is reported by Rothbrock et al. on page 273:

"Contaminants are usually deposited on the catalyst particles by soaking in a water solution of their salt. This gives a good qualitative picture of the effect of the various metals on the catalyst surface, but it does not reproduce the conditions under which the metals are actually deposited in commercial use. It was believed that depositing the contaminants from oil solution under conditions simulating plant procedures would give more significant results from a quantitative standpoint."

However, it was concluded, as reported on page 276, that catalysts poisoned by deposition of the contaminant from a metal naphthenate solution have a much greater effect in producing unwanted by-products in the cracking reaction than catalysts containing the same level of contaminants deposited from a commercial cracking stock. Furthermore, this process required extremely elaborate equipment.

In the other article cited, Connor et al., on page 278, conclude that there are so many variables involved in imitating commercial poisoning of cracking catalysts, that the study of the effect of each variable would be almost endless.

Now the discovery has been made that it is possible to closely simulate the poisoning effect of metal contaminants contained in a cracking feedstock without sending the catalyst through a pilot plant, and without the use of elaborate equipment. The method makes possible the addition of a single metal as well as a combination of metals. When a single metal is added its effects as a poison are in general the same effects produced by the same quantity of the same metal deposited in combination with others in a commercial operation. The addition of a single metal is not possible in commercial or pilot plant operations because no cracking stock is known to exist which contains only one metal contaminant.

This invention provides catalytic materials which are particularly adapted to overcome the above-mentioned problems. We have found that metals poisoning of silica-based cracking catalysts as experienced in cracking metal-contaminated hydrocarbons can be emulated by including in the catalyst a metal of atomic numbers of from 23 to 30 through contact of the catalyst with a solution of a decomposable organic oxygen-containing chelate of the metal and subjecting the impregnated catalyst to an elevated temperature to decompose the chelate. The invention also includes the testing of such catalysts in the cracking of hydrocarbons. Included in the metals of atomic numbers from 23 to 30 are those most frequently encountered in oil field stocks and the metals which the crude oil is most likely to pick up on its way from the field to the refinery. Of these metals, as mentioned above, nickel and vanadium are the most intensively studied in the laboratory because their poisoning effects are so large.

In cracking the feedstock is usually a mineral oil or petroleum hydrocarbon fraction such as straight run and recycle gas oils or other normally liquid hydrocarbons, most frequently boiling above the gasoline range. Cracking is ordinarily effected to produce gasoline as the most valuable product and is generally conducted at temperatures of about 750 to 1050° F., at pressures up to 2000 p.s.i.g., preferably about atmospheric to 100 p.s.i.g., and without substantial addition of free hydrogen to the system. If desired the analysis of the products from use of the contaminated or metals-impregnated catalyst can be compared with the analysis of the products from the use of similar but uncontaminated catalysts to determine the effect of metals-poisoning on the catalyst. The method permits study of the effect of a single poisoning metal on the silica-based cracking catalyst even though a combination of metals, e.g. nickel and vanadium, can be employed. The addition and study of a single poisoning metal by commercial or pilot plant cracking is impractical if not impossible, as available cracking stocks do not have only a single metal-contaminant.

The invention uses a class of materials known as "sequestrants." These are materials which have the ability to form non-ionic, soluble complexes with molecular fragments which normally dissolve in a polar solvent in the form of ions. These materials, when added to an ionic solution, effectively "hide" ions of particular valence characteristics, preventing the sequestered ion from taking part in its normal ionic reactions. Commercially available sequestering agents are generally classified as organic or inorganic. The condensed polyphosphates are the most widely used of the inorganic sequestering agents. Of the organic sequestering agents, two groups are of economic importance; the amino acids, particularly polycarboxylic acids such as ethylene diamine tetraacetic acid (EDTA) and the hydroxy carboxylic acids such as gluconic acid, citric acid and tartaric acid. Many of these organic materials are known which are effective to sequester heavy metals having atomic numbers from 23 to 30. These organic materials are known as "chelating agents" and the resulting metal-organic complexes are known as "chelates." The use of such chelates in preparing hydrocracking catalysts is described in U.S. Patent No. 2,889,287.

Chelates are distinguishable from ordinary organometallic compounds in the fact that chelates contain the metal component in a ring structure which is formed not only by valence bonds but also by "residual" or "coordinate" bonds which are "donated" to the metal atom by unshared electrons of a neighboring atom. An example is the chelate formed by nickel with 2 moles of the ammonium salt of EDTA, which may be represented as:

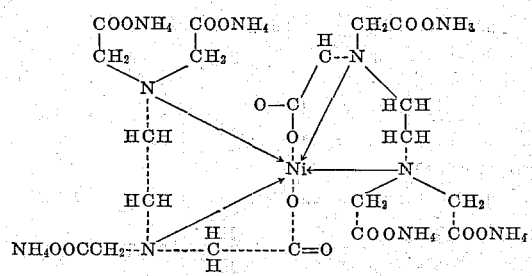

in which the arrows stand for coordinate bonds. The donor atoms which undergo "donation" to the metal are restricted to strongly non-metallic elements of Groups V and VI. Of these, nitrogen, oxygen and sulfur are the only common examples. The chelates employed in this invention contain oxygen in the molecule and frequently nitrogen as well, and the metal is attached to at least one oxygen atom by a valence bond or a coordinate bond and has a coordinate bond donated by either an oxygen or nitrogen atom. The cyclic compounds in which the metal is joined to two or more donor groups (such as the nitrogens in the structure shown above) of a single molecule or ion are particularly important, since they have exceptionally high stability.

It has been found in the study of metal chelates that each metal has a characteristic "coordination number" which is the total of its ordinary valence number plus the number of donor atoms with which it will associate to form its most stable complexes. Nickel, with a valence of +2, has a coordination number of 6. $Fe^{++}$ also has a coordination number of 6. $Cu^{++}$ has a coordination number of 4. Some known, stable nickel chelates are: $Ni^{II}$ (acetylacetonate)$_2$; $Ni^{II}$ (salicylaldehyde)$_2$; and $Ni^{II}$ (salicylaldehydeimine)$_2$. Vanadium bis-salicylaldehyde-d-(−) propylenediimine is also known.

The most popular chelating agent is ethylenediamine tetraacetic acid (EDTA). The sodium salt of this acid is commercially available under the trade names "Nullapon B," "Versene" and "Sequestrene A." Another commercial product known to be effective to chelate heavy metal ions is "Versen-ol" which is the trisodium salt of N-hydroxyethyl-ethylenediamine triacetic acid sold by the Bersworth Chemical Company of Framingham, Massachusetts.

Other natural and synthetic products are reported in the literature as effective to chelate heavy metal ions, such as palacatonic acid and palconic acid (61 Chem. & Eng. News, No. 13, Inventory Issue, 1954, p. 118); triethanolamine in alkaline solutions (U.S. Patent No. 2,544,649); polyethylene polyamino acids such as triethylene tetraamine tetraacetic acid and its homolog amino acids (No. 2,564,092); dextrin in an alkaline medium (U.S. Patent No. 2,678,303); certain epoxyamino acetic acid salts (U.S. Patent No. 2,712,544); amino derivatives of N-alkyl substituted aspartic acids and their functional derivatives (U.S. Patent No. 2,761,874); and triammonium salts of monoisopropanol ethylene diamine triacetic acid (U.S. Patent No. 2,808,435).

All of the above-mentioned chelating agents are water-soluble, at least at alkaline pH ratings, and are suitable, as are others of this class, for making the stable heavy metal chelate complexes required by the invention. In addition, sequestering agents such as acetylacetonate are known which are soluble in ethyl alcohol or other polar organic solvents which contain oxygen.

A solution of the chelate can be made by dissolving a suitable salt of the heavy metal, the poisoning effect of which is to be studied, in a suitable solvent, e.g. a polar solvent such as water. Suitable salts of all the metals with atomic numbers 23 to 30 are commercially available, although when the metal in question is contained in the anion, as in ammonium vanadate, the metal should be converted in the solution to its cationic form. This can be done, for example, by contacting the solution with a reducing agent such as hydrazine hydrate. The heavy metal is advantageously introduced into the solution as a salt of formic or other organic acid. The nitrate or other inorganic salt is suitable so long as it is soluble and does not contribute unduly to the poisoning effect by depositing on the catalyst. If an organic solvent is chosen, an organic salt is usually used.

To this salt solution is added a suitable amount of a chelating agent which is soluble in the solvent chosen. When the salt contains a metal in cationic form, it is preferred to make the chelate solution first, since the metal salt will dissolve more readily in a chelate solution than in a pure solvent. It is usually important that the resulting solution of the metal chelate contain no poisoning constituents, in cationic, anionic or undissociated form, other than the metal or group of metals selected for study. Sodium and other alkaline metals are especially detrimental. It is preferred that the solution contain the metal chelate as its sole non-volatile constituent. For this reason, it is preferred to use the free acid form of the chelating agent or its ammonium salt in order not to introduce ash-forming alkali metals into the solution, even though alkali metals are not usually sequestered and may be removed by a cation exchange resin in the acid state, or by other suitable means.

To poison a catalyst with this solution of a metal chelate, the catalyst is impregnated with the solution and then dried and calcined at an elevated temperature in order to evaporate the solvent, decompose the chelate, volatilize the decomposition products and put the catalyst into an activity state substantially similar to a freshly regenerated catalyst which has been naturally poisoned. The preferred method if impregnation consists of mixing with a quantity of solution enough silica-alumina base catalyst to absorb all of the solution. In practice, equal quantities of catalyst can be added to equal volumes of solutions, where each volume of solution contains the same solvent and a different concentration of chelate, to produce samples having varying levels of poisoning. The calcination temperature is generally in the range of about 700 to 1300° F.

The cracking zone for testing the catalytic material may constitute any desired type of catalytic cracking operation. Thus, the catalyst may be used as a fixed, moving or fluidized bed or may be in a more dispersed state. Typical cracking temperatures include about 750 to 1050° F. with the preferred temperature being from about 850 to 950° F. The pressure may vary from about atmospheric pressure to about 2,000 p.s.i.g. as previously noted. The catalytic agent may be regenerated intermittently or continuously as desired in order to restore or maintain the activity of the catalyst. For typical operations, the catalytic cracking of the hydrocarbon feed would normally result in a conversion of about 50–60 percent of the feedstock into a product boiling in the gasoline boiling range. The preferred catalyst is silica alumina but if desired silica magnesia or silica gel promoted with small amounts of other metal oxides could be utilized. The catalyst of this invention may undergo other treatments, e.g. contact with steam after calcination, as long as the essential effect of the chelate addition is not unduly deleteriously modified.

Generally, the hydrocarbon petroleum oils utilized as feedstock for the cracking process may be of any desired type normally utilized in catalytic cracking operations. This feedstock may or may not contain metal contaminants such as vanadium, iron, cobalt or nickel.

In preparing our catalytic material sufficient of the chelate solution is added to provide in the final catalyst sufficient of the metal to give a poisoning effect on the cracking activity of the catalyst. Generally, the poisoning metals content of the catalyst will not exceed about 5000 parts per million and often each of the poisoning metals present will not be more than about 1000 to 1500 p.p.m., for instance, the nickel content may be about 100 to 500 p.p.m.

EXAMPLE I

To make a catalyst poisoned with nickel, the following procedure was executed. The catalyst chosen was an unpoisoned silica-alumina cracking catalyst which had reached an equilibrium; that is, the mass contained particles of varying activities in the cracking process, due to certain portions of the total catalyst mass having been discarded and replaced by fresh, activated catalyst at various times during the course of the cracking process, where a cracking feedstock was used which contained no detectible amounts of poisoning metals.

A solution of nickel chelate was formed by suspending 0.39 gram of Sequestrene AA (a free acid form of EDTA) in distilled water and adding the minimum amount (3 drops) of ammonium hydroxide required to effect solution. To this solution 0.236 gram of nickel formate was added and readily dissolved. To this solution was added sufficient catalyst (100 grams) to absorb the entire solution. This wet mass was oven dried, calcined 3 hours at 1050° F. to decompose and volatilize the ammonia and organic constituents, and the resulting poisoned catalyst was submitted for activity testing by using it in a laboratory cracking unit and collecting the products. A series of such catalysts varying in nickel content was prepared by immersing equal amounts of catalyst in solutions of varying concentrations of chelate.

EXAMPLE II 0.296 gram of acetylacetonate was dissolved in a small quantity of ethyl alcohol and further ethyl alcohol was added to bring the solution to 60 mls. To this solution 0.249 gram of nickel formate was added to produce a nickel acetylacetonate complex containing 21.1% nickel. 100 grams of silica-alumina equilibrium catalyst were added to this solution and absorbed all of the liquid. The wet mass was dried and calcined essentially as reported in Example I.

EXAMPLE III

Ammonium vanadate (0.149 gram) was suspended in 40 ml. of water. 64 mg. of hydrazine hydrate was added to this solution with stirring. Then 0.256 gram of nitrotriacetic acid [$N(CH_2COOH)_3$] and 3 drops of ammonia, which was sufficient to dissolve the acid, were added. The resulting solution of vanadium chelate was diluted to 60 ml. and poured over 100 grams of silica-alumina catalyst which completely absorbed the liquid. The catalyst was then finished essentially as described in Example I.

A series of solutions of varying concentrations of vanadium chelate were prepared and used to impregnate 100 gram batches of silica-alumina catalyst to several different vanadium contents.

EXAMPLE IV

Diethylene triamine pentaacetic acid (0.528 gram), 5 drops $NH_4OH$ and 0.205 gram cuprice oxalate $$(CuC_2O_4 \cdot \tfrac{1}{2}H_2O)$$

were dissolved in water and diluted to 60 ml. This was used to impregnate 100 grams of silica-alumina catalyst which was finished essentially as described in Example I to produce a catalyst artificially poisoned with copper.

EXAMPLE V

The same procedure as above is used to impregnate and finish 100 grams of silica-alumina catalyst with a 60 ml. aqueous solution made from 0.373 gram hydroxyethyl diamine triacetic acid, 5 drops $NH_4OH$ and 0.229 gram of ferrous oxalate ($FeC_2O_4 \cdot 2H_2O$).

Nickel and vanadium were added to several samples of equilibrium silica-alumina catalyst at several levels by successive impregnations with solutions containing varying amounts of nickel and vanadium chelates of EDTA, as prepared essentially in Example I the vanadium having been reduced as in Example II before addition of the EDTA, with drying of the catalyst between impregnations.

Corresponding series of salt-poisoned catalysts were prepared by absorbing solutions of nickel nitrate, ammonium vanadate, and mixtures of nickel nitrate and ammonium vanadate, of varying concentrations with 100 gram batches of the equilibrium silica-alumina catalyst and finishing essentially as described in Example I.

The artificially salt-poisoned catalysts were tested for catalytic activity by using them in a catalytic cracking activity test unit. Samples of catalysts artificially poisoned with both nickel and vanadium by the process of Examples I and II, a naturally poisoned catalyst, an unpoisoned equilibrium catalyst sample and a sample of virgin catalyst were also tested to determine the difference in activity between naturally-poisoned and chelate-poisoned catalysts on the one hand and salt-poisoned catalysts on the other in producing gasoline, gas and coke from a cracking stock.

The cracking stock was a petroleum gas oil and the cracking was conducted at 900° F. and atmospheric pressure.

Table I

| Sample | Ni+V content (p.p.m.) | Type | Gas factor | Coke factor |
|---|---|---|---|---|
| A | | Virgin-unpoisoned | 1.31 | 1.12 |
| B | 460 | Equilibrium-unpoisoned | 1.16 | 0.83 |
| C | 2,425 | Naturally poisoned | | 2.44 |
| D | 2,456 | ____do____ | 2.58 | |
| E | 2,475 | Chelate poisoned | | 2.74 |
| F | 2,470 | ____do____ | 2.92 | |
| G | 2,530 | ____do____ | 2.92 | 2.73 |
| H | 2,480 | Salt poisoned | 3.29 | 4.15 |

Table I shows that catalysts poisoned by absorption of a solution of heavy metal chelate are quite similar in their activity to catalysts which have been poisoned to the same level of metal content by actual use in a cracking process where the cracking feed contains these metal impurities. This is in contradistinction to cracking catalysts which contain the same amount of metal contaminants derived from a solution of metal salts. The salt-poisoned catalysts have much higher gas and coke factors indicating much more severe poisoning effect from a given content of the poisoning metal.

When a catalyst is poisoned with only one metal contaminant a comparison between the catalyst which is poisoned by a chelate solution and a sample of the same catalyst poisoned by a salt solution using the method described in the aforesaid article by Rothbrock et al. on page 273, column 3, also shows the chelate poisoned catalyst to be substantially less active in producing the effects of poisoning than the salt-poisoned catalyst. A comparison of such artificially poisoned catalysts with a catalyst poisoned by actual use in a cracking process is not possible since all available cracking feedstocks which contain metal contaminants contain more than one metal. A comparison between two artificially poisoned catalysts is given in Table II.

Table II

| Sample | Ni content (p.p.m.) | Type | Gas factor | Coke factor |
|---|---|---|---|---|
| J | 1,060 | Chelate-poisoned | 2.16 | 1.80 |
| K | 1,080 | Salt-poisoned | 2.96 | 2.73 |

It can thus be seen that the method of the present invention makes possible a simple and inexpensive procedure for preparing poisoned catalysts for the studies needed to produce better catalysts and better cracking processes. The process of the invention can closely simulate the effects of natural poisoning of cracking catalysts. The process of the invention can also provide a catalyst poisoned with a single metal or with combinations of metals in proportions which are not possible in using natural cracking feedstocks. An economically feasible method for evaluating the poisoning resistance of commercial or experimental catalyst compositions is now available. Preparation of poisoned catalysts for processing studies is simplified and less costly. The steam treatment of these poisoned catalysts is the subject of copending application Serial No. 758,664, filed September 3, 1958, now abandoned.

We claim:

1. A method for testing the deactivating effects on a silica-based cracking catalyst of a metal of atomic number from 23 to 30 which consists essentially of cracking a hydrocarbon feedstock without substantial addition of free hydrogen to the system while using a silica-based catalyst artificially-poisoned with said metal, said artificially-poisoned catalyst being prepared by impregnating a silica-based cracking catalyst with a solution containing a decomposable organic oxygen-containing chelate of the said metal, and subjecting the impregnated catalyst to an elevated temperature to decompose the said organic chelate, the amount of said solution being sufficient to provide a poisoning amount and up to about 1500 p.p.m. of said metal on the catalyst.

2. A method for testing the effects on a silica-based cracking catalyst of a metal contaminant of atomic number from 23 to 30, which metal poisons the cracking activity of the catalyst, which consists essentially of artificially poisoning a silica-based hydrocarbon cracking catalyst to closely simulate the poisoning effect of said metal as a contaminant present in a hydrocarbon feedstock by impregnating the catalyst with a solution containing a decomposable organic oxygen-containing chelate of the said metal, and subjecting the impregnated catalyst to an elevated temperature to decompose said organic chelate, the amount of said solution being sufficient to provide a poisoning amount of metal and up to about 5000 p.p.m. of said metal on the catalyst, and cracking a hydrocarbon feedstock without substantial addition of free hydrogen to the system while using the artificially-poisoned silica-based catalyst.

3. The process of claim 2 in which the contaminant is nickel and the chelate provides about 100 to 500 p.p.m. of nickel.

4. The process of claim 2 in which the contaminant contains vanadium.

5. The process of claim 2 in which the solution is aqueous.

6. The process of claim 2 in which the organic chelate of the metal is formed by ethylene diamine tetraacetic acid.

7. The process of claim 2 in which the contaminant contains nickel and vanadium.

References Cited by the Examiner
UNITED STATES PATENTS 2,589,189 3/1952 Ciapetto et al. _____ 252—455
2,889,287 6/1959 Scott _____ 252—455

OTHER REFERENCES

"Industrial and Engineering Chemistry," vol. 49, No. 2, February 1957, pages 272–282.

MAURICE A. BRINDISI, *Primary Examiner.*

JULIUS GREENWALD, *Examiner.*